(12) United States Patent
Tamukai

(10) Patent No.: US 7,248,870 B2
(45) Date of Patent: Jul. 24, 2007

(54) PORTABLE TELEPHONE SET AND COMMUNICATION BASE STATION SWITCHING SYSTEM

(75) Inventor: Kiyoshi Tamukai, Tokyo (JP)

(73) Assignee: NEC Corporation, Tokyo (JP)

( * ) Notice: Subject to any disclaimer, the term of this patent is extended or adjusted under 35 U.S.C. 154(b) by 84 days.

(21) Appl. No.: 11/121,068

(22) Filed: May 4, 2005

(65) Prior Publication Data

US 2005/0192003 A1    Sep. 1, 2005

Related U.S. Application Data

(62) Division of application No. 09/866,714, filed on May 30, 2001, now Pat. No. 6,931,250.

(30) Foreign Application Priority Data

May 31, 2000    (JP)    ............................. 2000-163824

(51) Int. Cl.
    *H04Q 7/20*    (2006.01)
(52) U.S. Cl. ...................... 455/428; 455/424; 455/436; 342/357.06
(58) Field of Classification Search ........ 455/436–440, 455/403, 424, 525; 370/331; 342/357.06–357.07, 342/357.12
    See application file for complete search history.

(56) References Cited

U.S. PATENT DOCUMENTS 5,235,633 A    8/1993    Dennison et al.

(Continued)

FOREIGN PATENT DOCUMENTS

CN    1025102 C    6/1994

EP    0 454 638 A1    10/1991
JP    08-084363    3/1996

(Continued)

OTHER PUBLICATIONS

Japanese Office Action dated Jan. 27, 2003 with partial English translation.

(Continued)

*Primary Examiner*—CongVan Tran
(74) *Attorney, Agent, or Firm*—McGinn IP Law Group, PLLC

(57) ABSTRACT

A received electric field measuring section 11 measures the received electric fields from the communicative base station and the neighbor base stations. A received electric field memory section 12 stores received electric field patterns of the communicative base station and two given neighbor stations measured in the received electric field measuring section whenever the communicative base station for communication for the first time is switched over to one of the neighbor base stations. A received electric field pattern comparing section 13 compares the received electric field patterns of the communicative base station having and the two given neighbor stations and the received electric field patterns stored in the received electric field memory section whenever the received electric fields from the communicative base station been in communication with before and the two given neighbor base stations are measured in the received electric field measuring section. A base station position acquiring and switching means 14 and 15 acquires the position of a neighbor station, which the portable terminal is moving toward, in correspondence to a stored received electric field, which is found in the received electric field pattern comparing section to be identical in pattern with a measured received electric field, and switching the communicative base station over to the pertinent neighbor base station.

5 Claims, 18 Drawing Sheets

U.S. PATENT DOCUMENTS

| | | | |
|---|---|---|---|
| 5,293,643 A | 3/1994 | Israelsson | |
| 5,555,192 A | 9/1996 | Grube et al. | |
| 5,678,185 A | 10/1997 | Chia | |
| 5,815,814 A | 9/1998 | Dennison et al. | |
| 5,915,219 A | 6/1999 | Polyhonen | |
| 6,011,974 A | 1/2000 | Cedervall et al. | |
| 6,101,391 A | 8/2000 | Ishizuka et al. | |
| 6,233,448 B1 | 5/2001 | Alperovich et al. | |
| 6,327,471 B1 | 12/2001 | Song | |
| 6,353,598 B1 * | 3/2002 | Baden et al. | 370/280 |
| 6,362,783 B1 | 3/2002 | Sugiura et al. | |
| 6,496,493 B1 | 12/2002 | Chung | |
| 6,505,043 B1 | 1/2003 | Aihara | |
| 6,522,888 B1 | 2/2003 | Garceran et al. | |
| 6,542,743 B1 | 4/2003 | Soliman | |
| 6,564,057 B1 * | 5/2003 | Chun et al. | 455/437 |
| 6,594,494 B1 | 7/2003 | Kakehi | |
| 6,631,263 B1 | 10/2003 | Corkery | |

FOREIGN PATENT DOCUMENTS

| | | |
|---|---|---|
| JP | 10-042338 | 2/1998 |
| JP | 2874640 | 1/1999 |
| JP | 11-266473 | 9/1999 |

OTHER PUBLICATIONS

United Kingdom Search Report dated Jan. 14, 2002.
English translation of the Chinese Office Action dated Aug. 15, 2003.

* cited by examiner

| NEIGHBOR STATION / PATTERN | A | B | C | D | E | F |
|---|---|---|---|---|---|---|
| A | $L_{1A}(A)$ | $L_{2A}(B)$ | $L_{3A}(C)$ | $L_{4A}(D)$ | $L_{3A}(E)$ | $L_{2A}(F)$ |
| B | $L_{2B}(A)$ | $L_{1B}(B)$ | $L_{2B}(C)$ | $L_{3B}(D)$ | $L_{4B}(E)$ | $L_{3B}(F)$ |
| C | $L_{3C}(A)$ | $L_{2C}(B)$ | $L_{1C}(C)$ | $L_{2C}(D)$ | $L_{3C}(E)$ | $L_{4C}(F)$ |
| D | $L_{4D}(A)$ | $L_{3D}(B)$ | $L_{2D}(C)$ | $L_{1D}(D)$ | $L_{2D}(E)$ | $L_{3D}(F)$ |
| E | $L_{3E}(A)$ | $L_{4E}(B)$ | $L_{3E}(C)$ | $L_{2E}(D)$ | $L_{1E}(E)$ | $L_{2E}(F)$ |
| F | $L_{2F}(A)$ | $L_{3F}(B)$ | $L_{4F}(C)$ | $L_{3F}(D)$ | $L_{2F}(E)$ | $L_{1F}(F)$ |
| O | $L_{1O}(A)$ | $L_{1O}(B)$ | $L_{1O}(C)$ | $L_{1O}(D)$ | $L_{1O}(E)$ | $L_{1O}(F)$ |
|  | O → A | O → B | O → C | O → D | O → E | O → F |

PORTABLE TELEPHONE SET AND COMMUNICATION BASE STATION SWITCHING SYSTEM

The present Application is a Divisional Application of U.S. patent application Ser. No. 09/866,714, filed on May 30, 2001 now U.S. Pat. No. 6,931,250.

BACKGROUND OF THE INVENTION

This application claims benefit of Japanese Patent Application No. 2000-163824 filed on May 31, 2000, the contents of which are incorporated by the reference.

The present invention relates to portable terminals such as portable telephone sets and to a communicative base station switching system of a portable terminal for effectively switching the frequency thereof over to the communicative frequencies of neighbor base stations in order to switch the communicative base station.

Japanese Patent Laid-Open No. 9-284826 discloses a portable terminal, which switches the prevailing communicative base station over to a next frequency base station while in motion.

FIG. 10 is a view showing the relationship of the communicative areas covered by a portable terminal and base stations in the prior art. As shown in the Figure, a plurality of base stations A, B, C . . . are located around a communicative base station O. The communicative base station O and the neighbor base stations A, B, C . . . have fixed communicative areas with borderline parts thereof overlapping one another.

A portable terminal 10 such as a portable telephone set is located in the area of the communicative base station O and communicating with the base station O.

The communication of the portable terminal 10 with the communicative base station O and the neighbor base stations A, B, C, . . . is made at different frequencies.

When the portable terminal 10 in motion and in communication with the communicative base station O gets out the area of the communicative base station and enters one of the neighbor base stations A, B, C, . . . , it switches the base station 10 over to the maximum received power level neighbor base station after receiving the received power measurement of the neighbor base stations.

At the time of the switching, the portable terminal 10 measures the received power levels by switching frequencies quickly with a synthesizer at a predetermined frequency. The received power level measurement requires a predetermined time.

However, since the portable terminal 10 switches frequencies quickly, a problem is posed that the characteristics of some synthesizer are subject to deterioration.

In addition, in the portable terminal 10 the switching to the neighbor base stations always requires a predetermined time, and a problem is thus posed that switching process software is subject to great burden.

SUMMARY OF THE INVENTION

In view of the above problems, an object of the present invention is to provide a communicative base station switching system of a portable terminal, which can prevent the deterioration of synthesizer characteristics at the time of the frequency switching to neighbor base stations, while also permitting switching time reduction to provide for the possibility of other processes and reduction of the burden on switching process software.

In order to solve the problems, the present invention provides a communicative base station switching system of a portable terminal for switching a communicative base station to neighbor base stations while in motion comprising: a received electric field measuring section for measuring the received electric fields from the communicative base station and the neighbor base stations; a received electric field memory section for storing received electric field patterns of the communicative base station and two given neighbor stations measured in the received electric field measuring section whenever the communicative base station for communication for the first time is switched over to one of the neighbor base stations; a received electric field pattern comparing section for comparing the received electric field patterns of the communicative base station having and the two given neighbor stations and the received electric field patterns stored in the received electric field memory section whenever the received electric fields from the communicative base station been in communication with before and the two given neighbor base stations are measured in the received electric field measuring section; and a base station position acquiring and switching means for acquiring the position of a neighbor station, which the portable terminal is moving toward, in correspondence to a stored received electric field, which is found in the received electric field pattern comparing section to be identical in pattern with a measured received electric field, and switching the communicative base station over to the pertinent neighbor base station.

With this arrangement, it is possible to reduce the number of received electric field measurements in the received electric field measuring section, prevent the deterioration of synthesizer characteristics at the time of the frequency switching to neighbor base stations and reduce the switching time to provide for the possibility of other processes and reduce the burden on switching process software.

Preferably, when the portable terminal communicates with the communicative base station for the first time, the received electric field pattern comparing section executes the comparison after the received electric field patterns of all the plurality of neighbor base stations have been stored in the received electric field comparing section by switching the communicative base station over to the neighbor base stations.

With this arrangement, after completion of the data storing in the received electric field memory section by switching the communicative base station over to all the plurality of neighbor base stations, the comparison in the received electric field pattern comparing section is executed.

Preferably, when the portable terminal communicates with the communicative base station for the first time while the received electric field patterns of all the plurality of neighbor base stations have not been stored in the received electric field comparing section by switching the communicative base station over to the neighbor base stations, the received electric field measuring section executes the received electric field measurement for switching the communicative base station over to the neighbor base station of the maximum received electric field intensity.

With this arrangement, for a transient time until the completion of the data storing in the received electric field memory section, the switching of the communicative base station is executed by measuring the received power levels from all the neighbor stations and switching the frequency to the frequency of the maximum received electric field intensity neighbor base station.

Preferably, the two given neighbor base stations are either two adjacent base stations or two adjacent but one base stations or two adjacent but two base stations.

With this arrangement, different received electric field patterns are formed concerning two given ones of the neighbor base stations.

Further, the present invention provides a communicative base station switching method of a portable terminal for switching a communicative base station to neighbor base stations while in motion comprising: a step for measuring the received electric fields from the communicative base station and the neighbor base stations; a step for storing received electric field patterns of the communicative base station and two given neighbor stations measured in the received electric field measuring section whenever the communicative base station for communication for the first time is switched over to one of the neighbor base stations; a step for comparing the received electric field patterns of the communicative base station having and the two given neighbor stations and the received electric field patterns stored in the received electric field memory section whenever the received electric fields from the communicative base station been in communication with before and the two given neighbor base stations are measured in the received electric field measuring section; and a step for acquiring the position of a neighbor station, which the portable terminal is moving toward, in correspondence to a stored received electric field, which is found in the received electric field pattern comparing section to be identical in pattern with a measured received electric field, and switching the communicative base station over to the pertinent neighbor base station.

With this arrangement, like the above arrangement, it is possible to reduce the number of received electric field measurements in the received electric field measuring section, prevent the deterioration of synthesizer characteristics at the time of the frequency switching to neighbor base stations and reduce the switching time to provide for the possibility of other processes and reduce the burden on switching process software.

Still further, the present invention provides a communicative base station switching system of a portable terminal for switching a communicative base station while in motion comprising: a base station memory section for storing base station position data; a base station position comparing section for receiving position data from a global positioning system of a mobile body and obtaining and comparing the distances of the base stations from the portable terminal by using the received position data as the position data of the portable terminal; and a base station frequency switching section for switching the communicative base station of the portable terminal to the neighbor base station closest to the portable terminal according to the result of comparison in the base station position comparing section.

With this arrangement, the portable terminal can ensure more accurate operation in cooperation with the global positioning system (GPS) and switch the frequency to the proper base station without need of measuring the received power level from any neighbor base station.

The present invention provides a communicative base station switching system of a portable terminal for switching a communicative base station while in motion in which base station position data and the portable terminal position data are obtained, the distances of the base stations from the portable terminal are obtained on the basis of the obtained position data, and the communicative base station of the portable terminal is switched to the neighbor base station closest to the portable terminal.

Other objects and features will be clarified from the following description with reference to attached drawings.

BRIEF DESCRIPTION OF THE DRAWINGS

FIG. 3 is a view showing data stored in the received electric field memory section 12;

PREFERRED EMBODIMENTS OF THE INVENTION

Preferred embodiments of the present invention will now be described with reference to the drawings.

Figure 1:
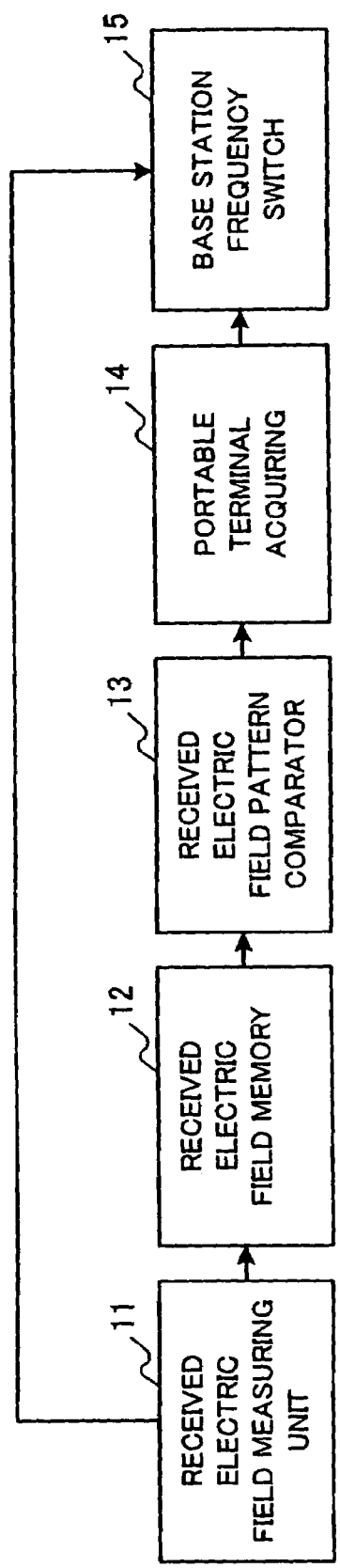
FIG. 1 is a block diagram showing the schematic construction of a communicative base station switching system of a portable terminal according to the present invention.

FIG. 1 is a block diagram showing the schematic construction of a communicative base station switching system of a portable terminal according to the present invention.

As shown in the Figure, the communicative base station switching system 20, which is provided in a portable terminal 10, comprises a received electric field measuring section 11.

The received electric field measuring section 11 recognizes a communicative base station in a prevailing communicable area, and checks whether the own portable terminal has communicated with the recognized base station before.

When the own portable terminal 10 communicates with the communicable base station for the first time, the received electric field measuring section 11 monitors the received power levels concerning all neighbor base stations at a predetermined frequency in a predetermined period of time. When the terminal has communicated with the communicative base station before, the section 11 selects two given neighbor base stations, and monitors the received power levels concerning the three base stations, i.e., the selected base stations and the communicative base station, at a predetermined frequency in a predetermined period of time.

The communicative base station switching system also comprises a received electric field memory section 12. When the own portable terminal 10 communicates with the communicative base station for the first time, the section 12 stores the received electric fields of all the neighbor base stations monitored in the received electric field measuring section 11. When the terminal moving in a given direction in the area of the communicative base station gets out of this area and enters the area of a neighbor base station, the section 12 stores the received electric fields of all the neighbor base stations that are monitored in the section 11 at this time.

The communicative base station switching system further comprises a received electric field pattern comparing section 13. When the own portable terminal 10 has communicated with the communicative base station before, the section 13 compares the electric field patterns concerning three base stations, i.e., two given neighbor base stations and the prevailing communicative base station, as measured in the received electric field measuring section 11 at a predetermined frequency and the received electric field patterns stored in the received electric field memory section 12.

The communicative base station switching system still further comprises a portable terminal position acquiring section 14. The section 14 acquires the position of the own portable terminal from the result of the received electric field pattern comparison in the received electric field pattern comparing section 13.

The communicative base station switching system yet further comprises a base station frequency switching section 15. The section 15 switches the frequency of the communicative base station by switching the frequency of the own portable terminal 10 to the frequency of a base station acquired by the portable terminal position acquiring section 14.

When the portable terminal 10 communicates with the communicative base station for the first time, the received electric field pattern comparing section 13 executes the comparison after storing the received electric field patterns of all the plurality of neighbor base stations by switching the communicative base station over to the neighbor base stations.

In this way, the number of the received electric fields measured in the received electric field measuring section 11 is reduced.

More specifically, when the portable terminal 10 communicates with the communicative base station for the first time while the received electric field patterns of all the plurality of neighbor base stations have not been stored by switching the communicative base stations to the neighbor base stations, the received electric field measuring section 11 executes the received electric field measurement for switching the communicative base station over to the neighbor base station having the maximum received electric field intensity.

Thus, the data comparison in the received electric field pattern comparing section is executed after completion of the data storing in the received electric field memory section by the switching of the communicative base station over to all the plurality of neighbor base stations.

In addition, for a transient time until completion of the data storing in the received electric field pattern storing section, as in the prior art the switching of the communicative base station is executed by measuring the received power levels from all the neighbor base stations and switching the frequency over to the frequency of the maximum received electric field intensity neighbor base station.

The various parts of the system will now be described in detail.

FIGS. 2(*a*) to 2(*f*) are views for describing the measurement of received electric fields in the received electric field measuring section 11 in FIG. 1 when the portable terminal gets out of the area of the communicative base station and enters the area of a neighbor base station.

As shown in the Figures, it is assumed that the communicative base station O is surrounded by neighbor base stations A to F, that the base stations O and neighbor base stations A to F each cover a fixed communicable area, and that the communicable areas of the base stations O and neighbor base stations A to F partly overlap parts of the neighbor areas.

It is also assumed that the portable terminal 10, such as a portable telephone set, is located in the communicable area of the communicative base station O and communicates with the same for the first time.

It is further assumed that the portable terminal 10 is communicable with the communicative base station O and the neighbor base stations A to F at frequencies $f_A$ to $f_F$, respectively.

The received electric field measuring section 11 monitors the received electric fields of the communicative base station O, which the portable terminal 10 is to communicate with for the first time, and all the neighbor base stations A to F at a predetermined frequency.

Referring to FIG. 2(*a*), when the portable terminal 10 gets out the area of the communicative base station O and enters the area of the neighbor station A, in the terminal 10 the received electric fields from the neighbor base station A and the communicative base station O are designated by $L_{1A}(A)$ and $L_{1O}(A)$, respectively, those from the neighbor base stations B and F are designated by $L_{2B}(A)$ and $L_{2F}(A)$, respectively, those from the neighbor base stations C and E are designated by $L_{3C}(A)$ and $L_{3E}(A)$, respectively, and that from the neighbor base station D is designated by $L_{4D}(A)$.

From the position relationship of the base stations, the intensities of the above received electric fields are related as $$L_{1A}(A) \approx L_{1O}(A) > L_{2B}(A) \approx L_{2F}(A) > L_{3C}(A) \approx L_{3E}(A) > L_{4D}(A).$$

Referring to FIG. 2(*b*), when the portable terminal 10 gets out the area of the communicative base station O and enters the neighbor base station B, in the terminal 10 the received electric fields from the neighbor base station B and the communicative base station O are designated by $L_{1B}(B)$ and $L_{1O}(B)$, respectively, those from the neighbor base stations C and A are designated by $L_{2C}(B)$ and $L_{2A}(B)$, respectively, those from the neighbor base stations D and F are designated by $L_{3D}(B)$ and $L_{3F}(B)$, respectively, and that from the neighbor base station E is designated by $L_{4E}(B)$.

From the position relationship of the base stations, the intensities of the received electric fields are related as $$L_{1B}(B) \approx L_{1O}(B) > L_{2C}(B) \approx L_{2A}(B) > L_{3D}(B) \approx L_{3F}(B) > L_{4E}(B).$$

Referring to FIG. 2(*c*), when the portable terminal 10 gets out the area of the communicative base station O and enters the neighbor base station C, in the terminal 10 the received electric fields from the neighbor base station C and the communicative base station O are designated by $L_{1C}(C)$ and $L_{1O}(C)$, respectively, those from the neighbor base stations D and B are designated by $L_{2D}(C)$ and $L_{2B}(C)$, respectively, those from the neighbor base stations A and E are designated by $L_{3A}(C)$ and $L_{3E}(C)$, respectively, and that from the neighbor base station F is designated by $L_{4F}(C)$.

From the position relationship of the base stations, the intensities of the received electric fields are related as $$L_{1C}(C) \approx L_{1O}(C) > L_{2D}(C) \approx L_{2B}(C) > L_{3E}(C) \approx L_{3A}(C) > L_{4F}(C).$$

Figure 2A:
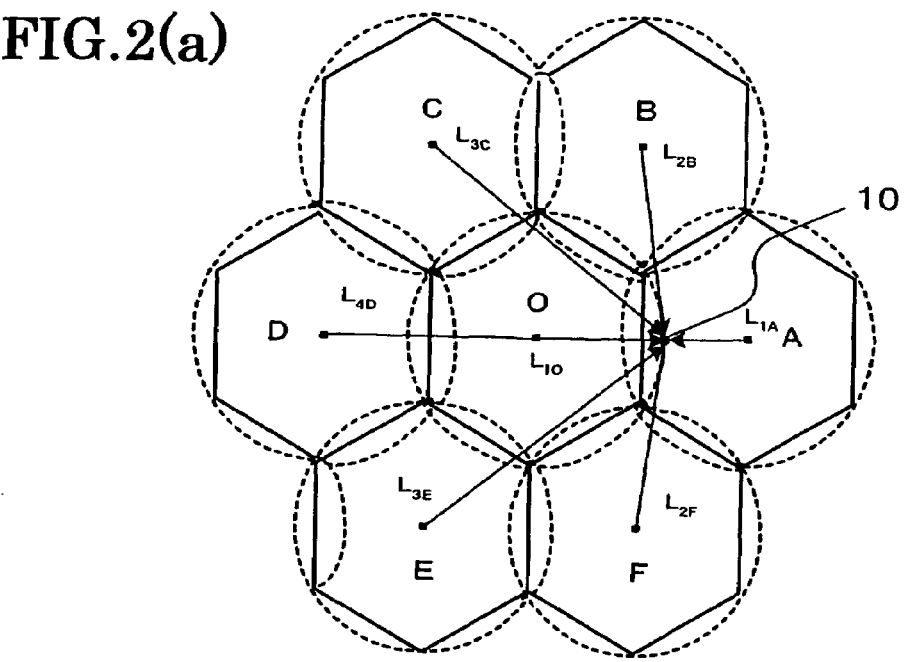
FIGS. 2(a) to 2(f) are views for describing the measurement of received electric fields in the received electric field measuring section 11 in FIG. 1 when the portable terminal gets out of the area of the communicative base station and enters the area of a neighbor base station.
Figure 2B:
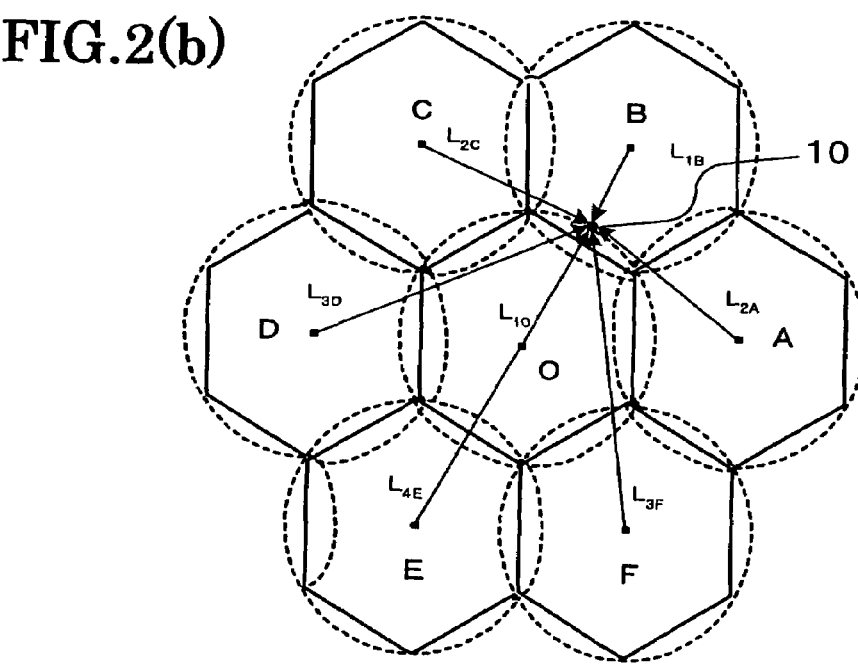
Figure 2C:
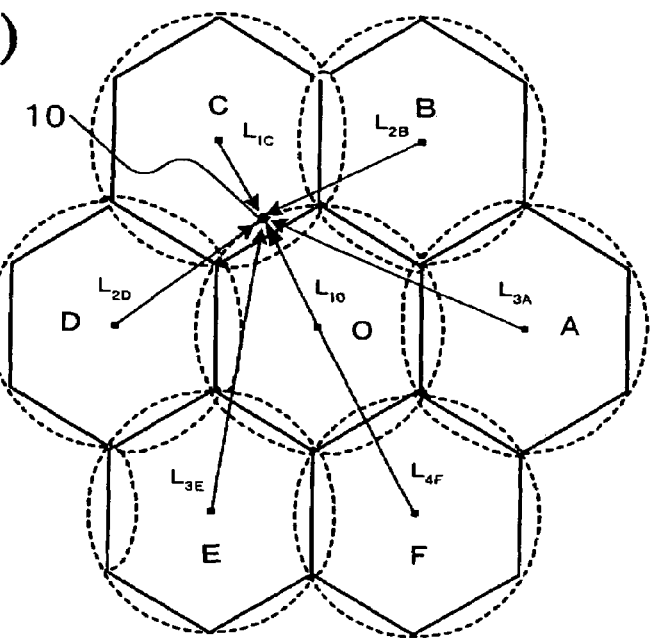
Figure 2D:
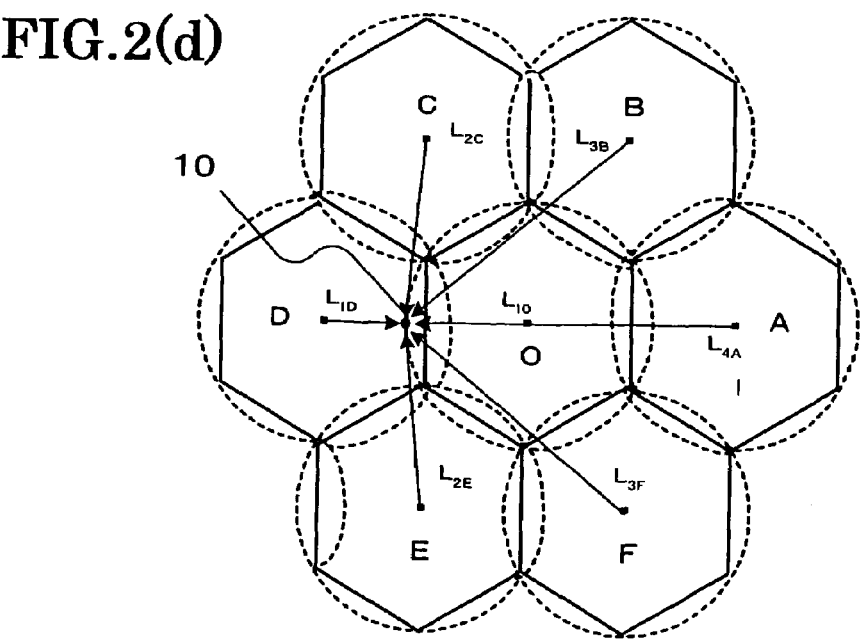

Referring to FIG. 2(d), when the portable terminal 10 gets out the area of the communicative base station O and enters the neighbor base station D, in the terminal 10 the received electric fields from the neighbor base station D and the communicative base station O are designated by $L_{1D}(D)$ and $L_{1O}(D)$, respectively, those from the neighbor base stations E and C are designated by $L_{2E}(D)$ and $L_{2C}(D)$, respectively, those from the neighbor base stations B and F are designated by $L_{3B}(D)$ and $L_{3F}(D)$, respectively, and that from the neighbor base station A is designated by $L_{4A}(D)$.

From the position relationship of the base stations, the intensities of the received electric fields are related as $$L_{1D}(D) \approx L_{1O}(D) > L_{2E}(D) \approx L_{2C}(D) > L_{3B}(D) \approx L_{3F}(D) > L_{4A}(D).$$

Figure 2E:
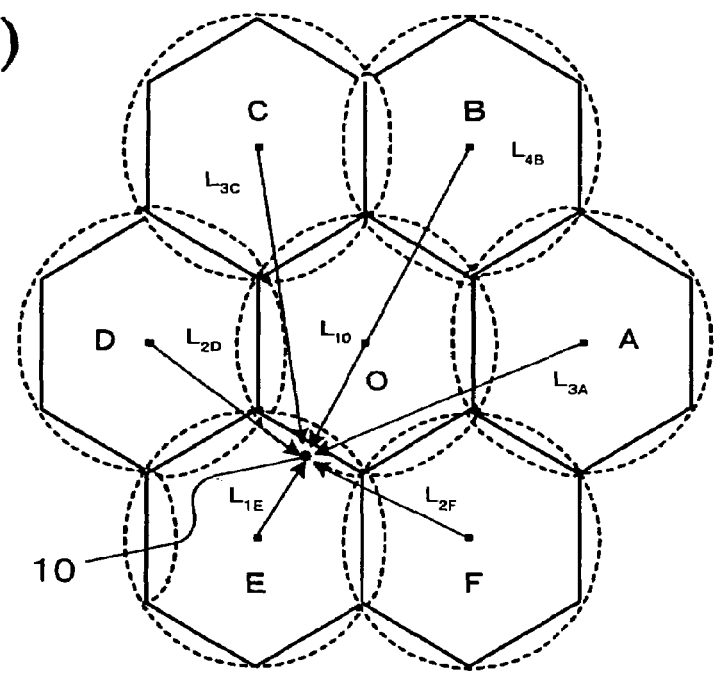

Referring to FIG. 2(e), when the portable terminal 10 gets out the area of the communicative base station O and enters the neighbor base station E, in the terminal 10 the received electric fields from the neighbor base station E and the communicative base station O are designated by $L_{1E}(E)$ and $L_{1O}(E)$, respectively, those from the neighbor base stations D and F are designated by $L_{2D}(E)$ and $L_{2F}(E)$, respectively, those from the neighbor base stations A and C are designated by $L_{3A}(E)$ and $L_{3C}(E)$, respectively, and that from the neighbor base station B is designated by $L_{4B}(E)$.

From the position relationship of the base stations, the intensities of the received electric fields are related as $$L_{1E}(E) \approx L_{1O}(E) > L_{2D}(E) \approx L_{2F}(E) > L_{3A}(E) \approx L_{3C}(E) > L_{4B}(E).$$

Figure 2F:
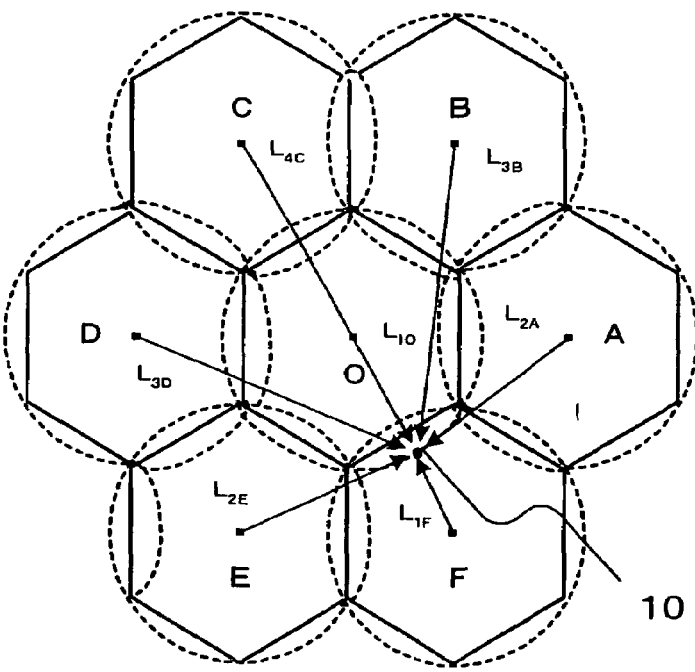

Referring to FIG. 2(f), when the portable terminal 10 gets out the area of the communicative base station O and enters the neighbor base station F, in the terminal 10 the received electric fields from the neighbor base station F and the communicative base station O are designated by $L_{1F}(F)$ and $L_{1O}(F)$, respectively, those from the neighbor base stations E and A are designated by $L_{2E}(F)$ and $L_{2A}(F)$, respectively, those from the neighbor base stations D and B are designated by $L_{3D}(F)$ and $L_{3B}(F)$, respectively, and that from the neighbor base station C is designated by $L_{4C}(F)$.

From the position relationship of the base stations, the intensities of the received electric fields are related as $$L_{1F}(F) \approx L_{1O}(F) > L_{2E}(F) \approx L_{2A}(F) > L_{3D}(F) \approx L_{3B}(F) > L_{4C}(F).$$

FIG. 3 is a view showing data stored in the received electric field memory section 12.

As shown in the Figure, when the portable terminal 10 gets out the area of the communicative base station O and enters the areas of the neighbor stations A to E, the received electric fields from the neighbor base stations A to F are measured in the terminal 10 along with that of the communicative base station O. As an example, of these measured received electric fields those of the neighbor base stations A and B and the communicative base station O are stored in the received electric field memory section 12 as respective patterns as shown enclosed in the bold frames.

As is seen from the Figure, when the portable terminal 10 enters the neighbor base stations A to F, the portable terminal 10 obtains different measured received electric field intensity patterns concerning the neighbor base stations A to F and the communicative base station O.

FIGS. 4(a) to 4(f) are views for describing an example of the received electric fields of three base stations, i.e., two given neighbor stations and the communicative base station, as measured in the received electric field measuring section 11.

As shown in the Figures, when the portable terminal 10 has communicated with the communicative base station O before, the received electric field measuring section 11 monitors the received electric fields of a reduced number of neighbor base stations, i.e., two adjacent neighbor base stations, and the communicative base station at a predetermined frequency.

Figure 4A:
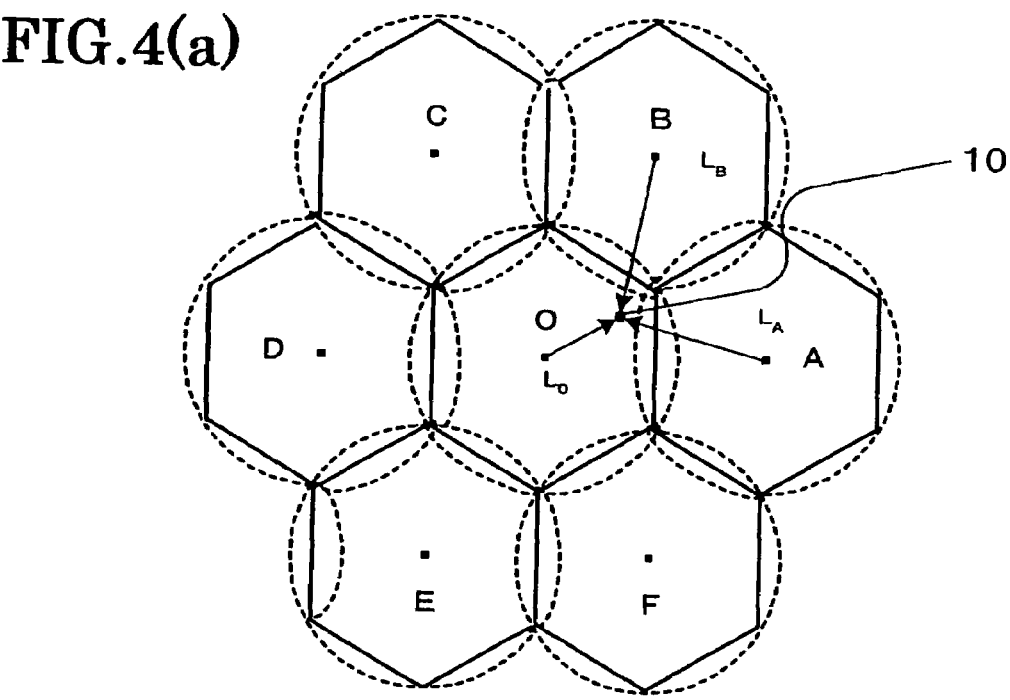
FIGS. 4(a) to 4(f) are views for describing an example of the received electric fields of three base stations, i.e., two given neighbor stations and the communicative base station, as measured in the received electric field measuring section 11.

Preferably, as shown in FIG. 4(a), the received electric field measuring section 11 monitors the received electric fields $L_A$, $L_B$ and $L_O$ from the neighbor base stations A and B and the communicative base station O.

Figure 4B:
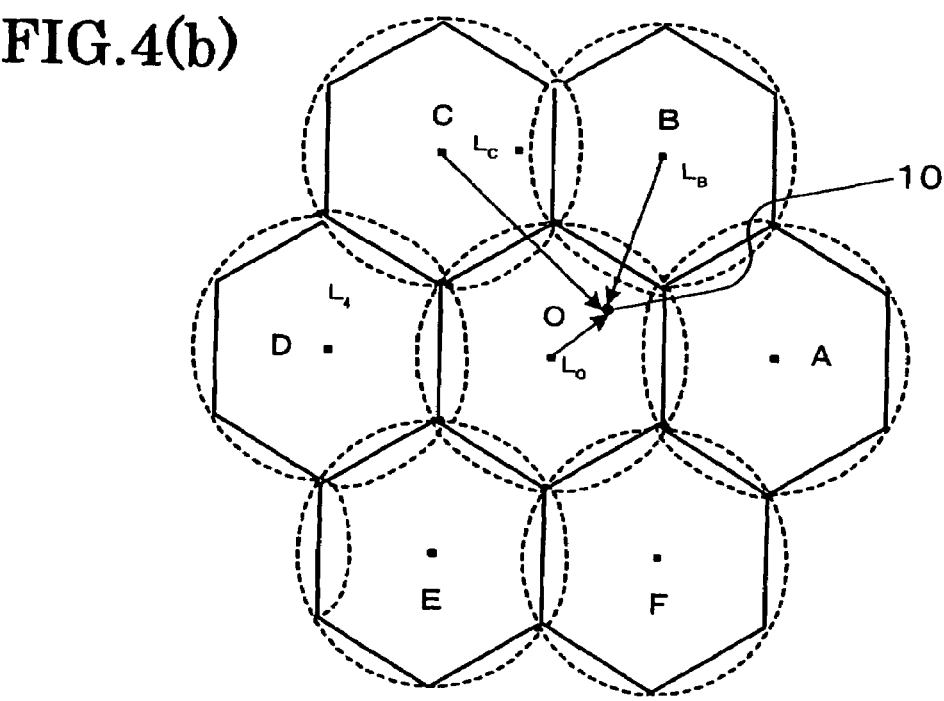

Preferably, as shown in FIG. 4(b), the received electric field measuring section 11 monitors the received electric fields $L_B$, $L_C$ and $L_O$ from the neighbor base stations B and C and the communicative base station O.

Figure 4C:
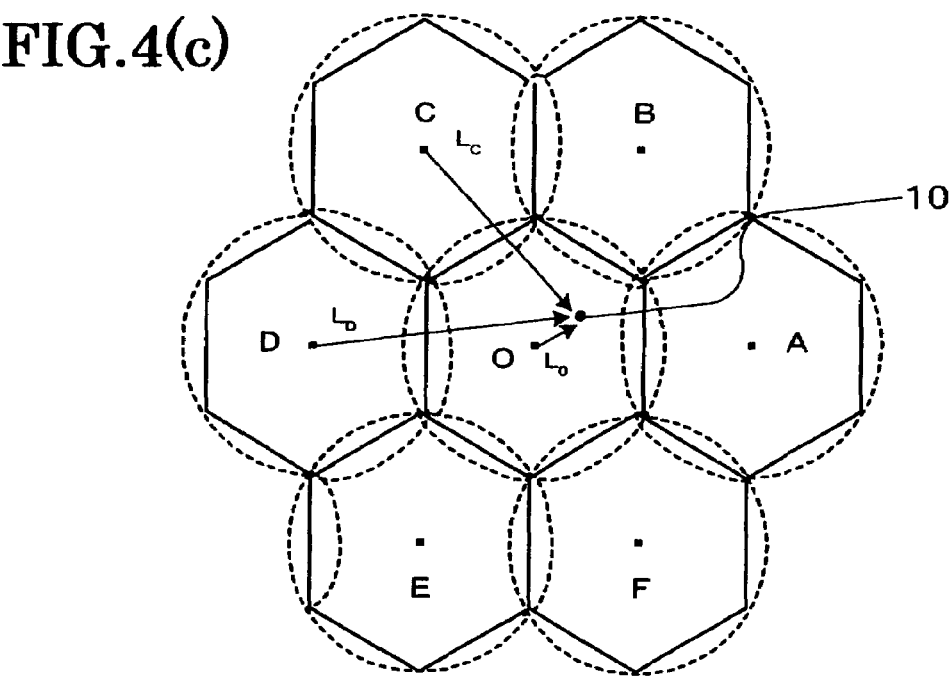

Preferably, as shown in FIG. 4(c), the received electric field measuring section 11 monitors the received electric fields $L_C$, $L_D$ and $L_O$ from the neighbor base stations C and D and the communicative base station O.

Figure 4D:
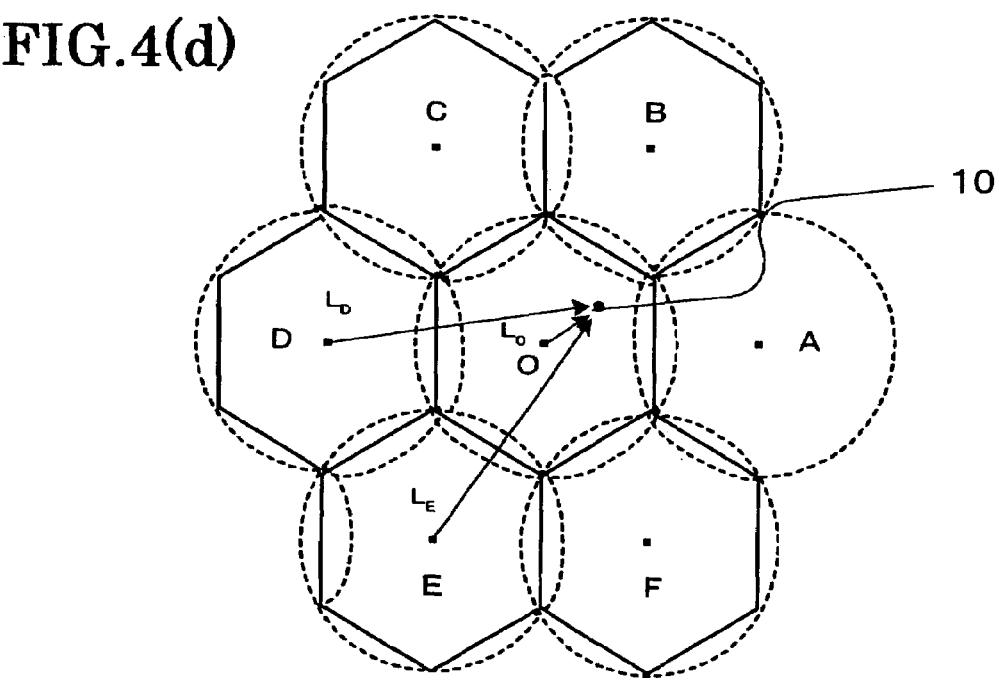

Preferably, as shown in FIG. 4(d), the received electric field measuring section 11 monitors the received electric fields. $L_D$, $L_E$ and $L_O$ from the neighbor base stations D and E and the communicative base station O.

Figure 4E:
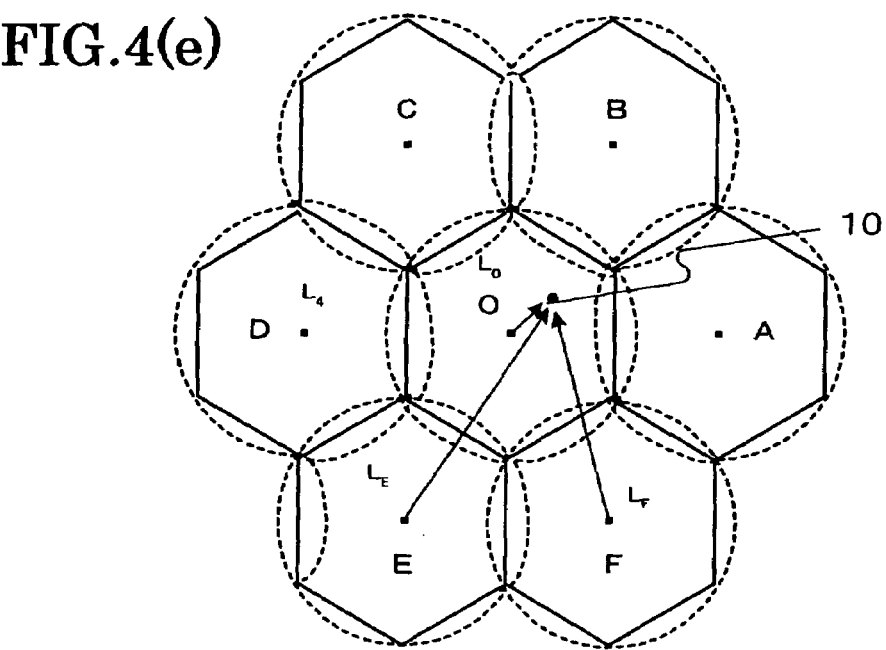

Preferably, as shown in FIG. 4(e), the received electric field measuring section 11 monitors the received electric fields $L_E$, $L_F$ and $L_O$ from the neighbor base stations E and F and the communicative base station O.

Figure 4F:
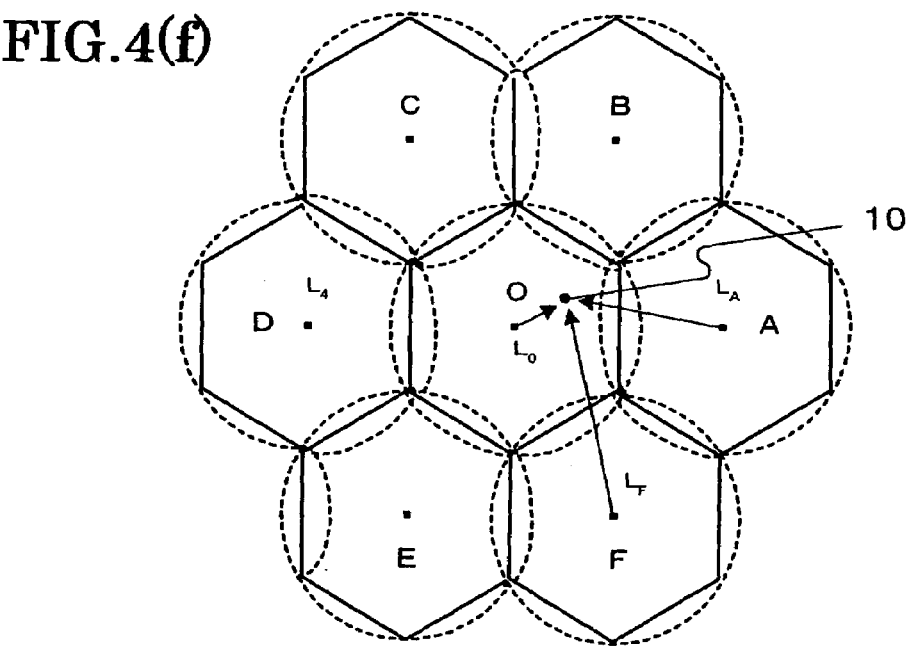

Preferably, as shown in FIG. 4(f), the received electric field measuring section 11 monitors the received electric fields $L_F$, $L_A$ and $L_O$ from the neighbor base stations F and A and the communicative base station O.

FIGS. 5(a) to 5(f) are views for describing a different example of the received electric fields of three base stations, i.e., two given neighbor base stations and the communicative base station, as measured in the electric field measuring station 11.

As shown in the Figures, when the portable terminal 10 has communicated with the communicative base station 10 before, like the above base, the received electric field measuring section 11 monitors the received electric fields of a reduced number of neighbor base stations, i.e., two adjacent but one neighbor base stations, and the communicative base station at a predetermined frequency.

Figure 5A:
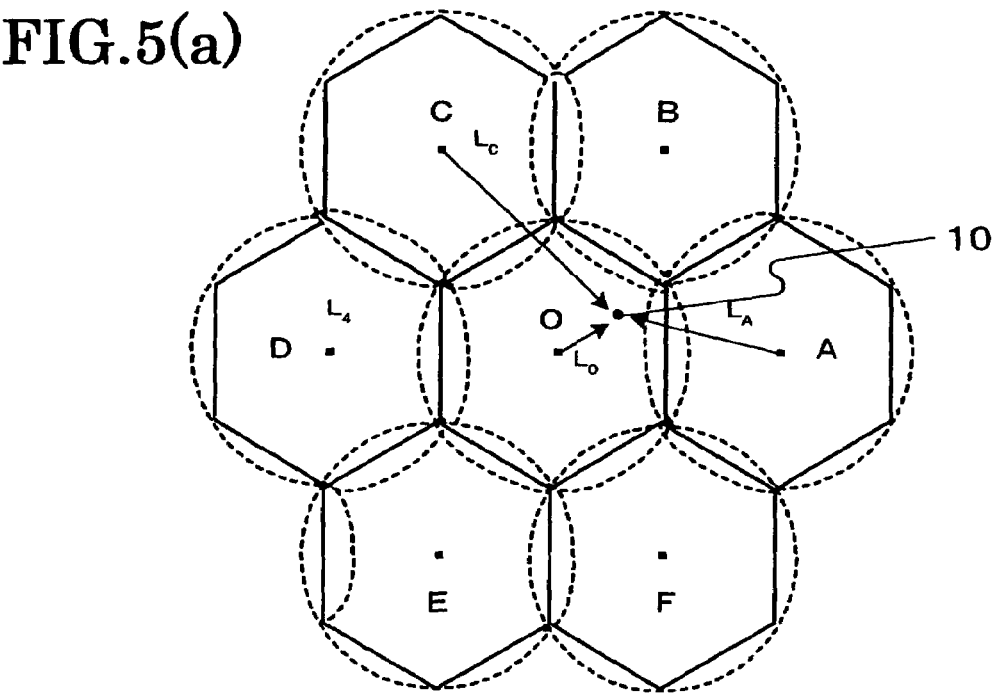
FIGS. 5(a) to 5(f) are views for describing a different example of the received electric fields of three base stations, i.e., two given neighbor base stations and the communicative base station, as measured in the electric field measuring station 11.

Preferably, as shown in FIG. 5(a), the received electric field measuring section 11 monitors the received electric fields $L_A$, $L_C$ and $L_O$ from the neighbor base stations A and C and the communicative base station O.

Figure 5B:
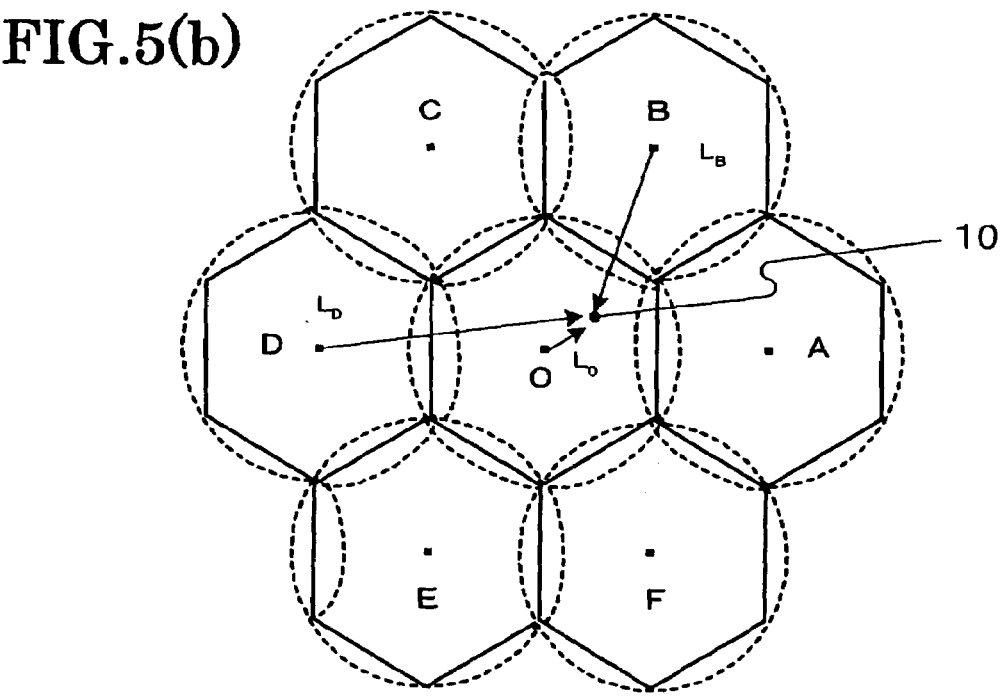

Preferably, as shown in FIG. 5(b), the received electric field measuring section 11 monitors the received electric fields $L_B$, $L_D$ and $L_O$ from the neighbor base stations B and D and the communicative base station O.

Figure 5C:
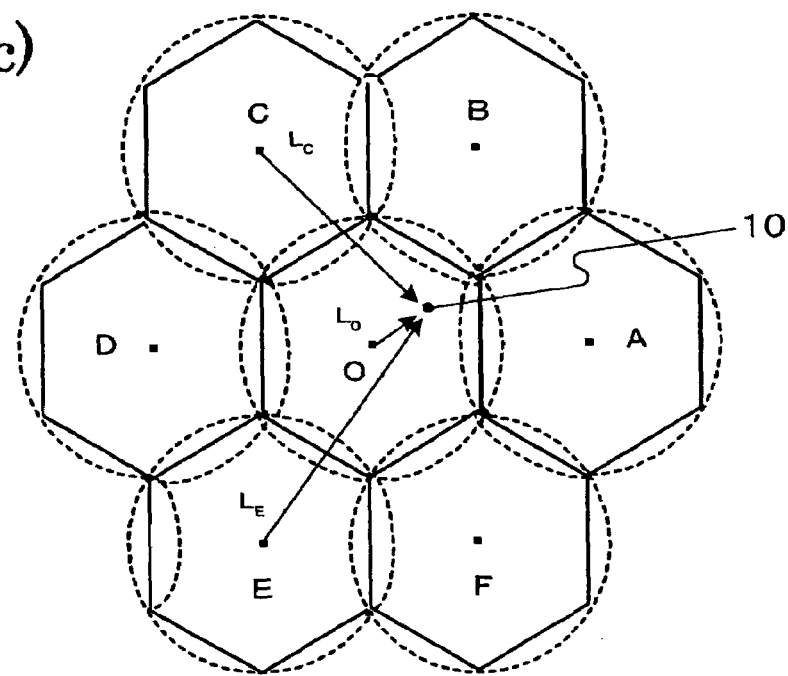

Preferably, as shown in FIG. 5(c), the received electric field measuring section 11 monitors the received electric fields $L_C$, $L_E$ and $L_O$ from the neighbor base stations C and E and the communicative base station O.

Figure 5D:
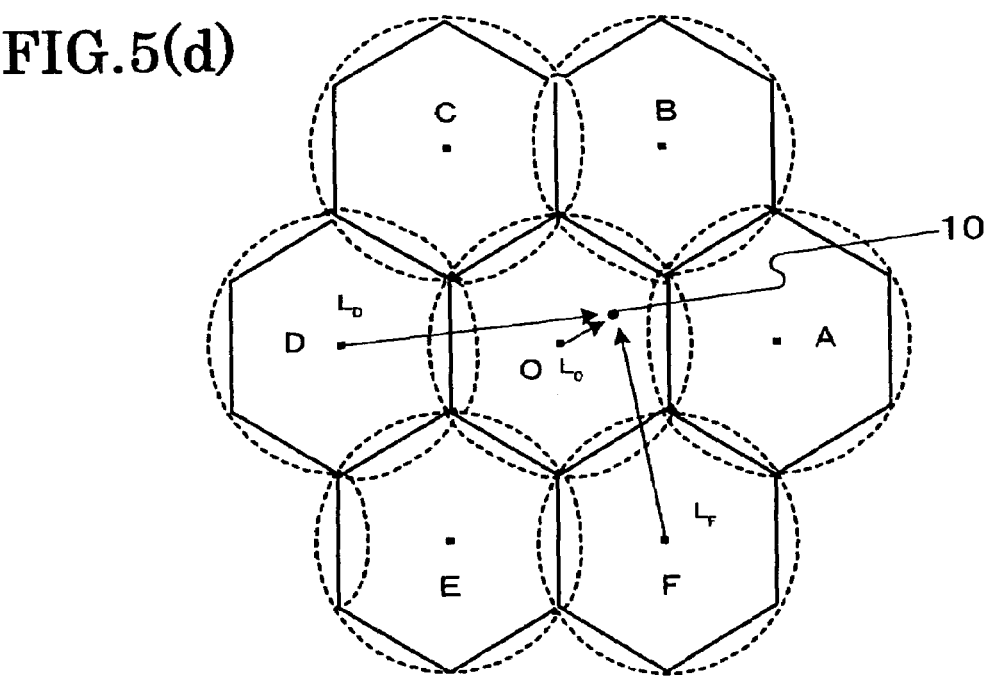

Preferably, as shown in FIG. 5(d), the received electric field measuring section 11 monitors the received electric fields $L_D$, $L_F$ and $L_O$ from the neighbor base stations D and F and the communicative base station O.

Figure 5E:
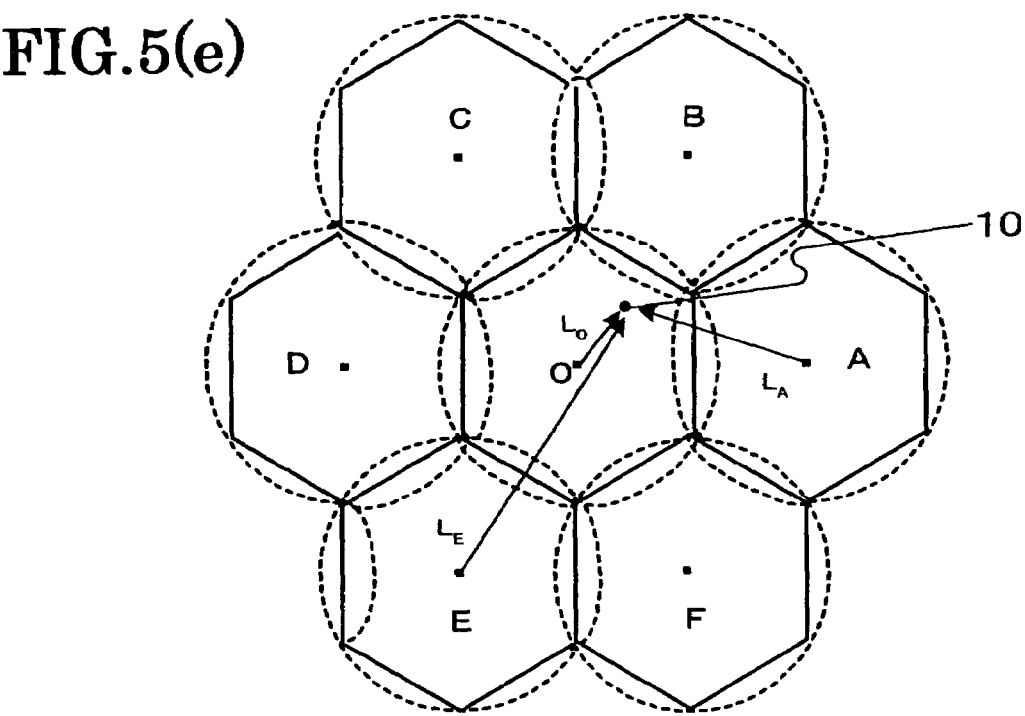

Preferably, as shown in FIG. 5(e), the received electric field measuring section 11 monitors the received electric fields $L_A$, $L_E$ and $L_O$ from the neighbor base stations A and E and the communicative base station O.

Figure 5F:
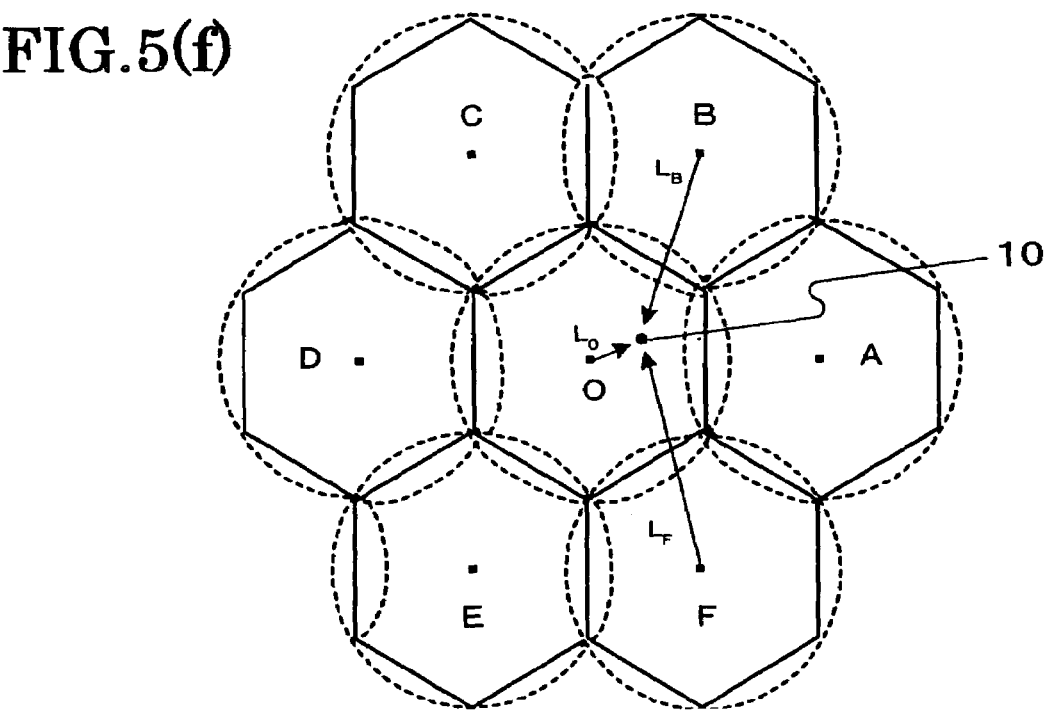

Preferably, as shown in FIG. 5(f), the received electric field measuring section 11 monitors the received electric fields $L_B$, $L_F$ and $L_O$ from the neighbor base stations B and F and the communicative base station O.

Figure 6A:
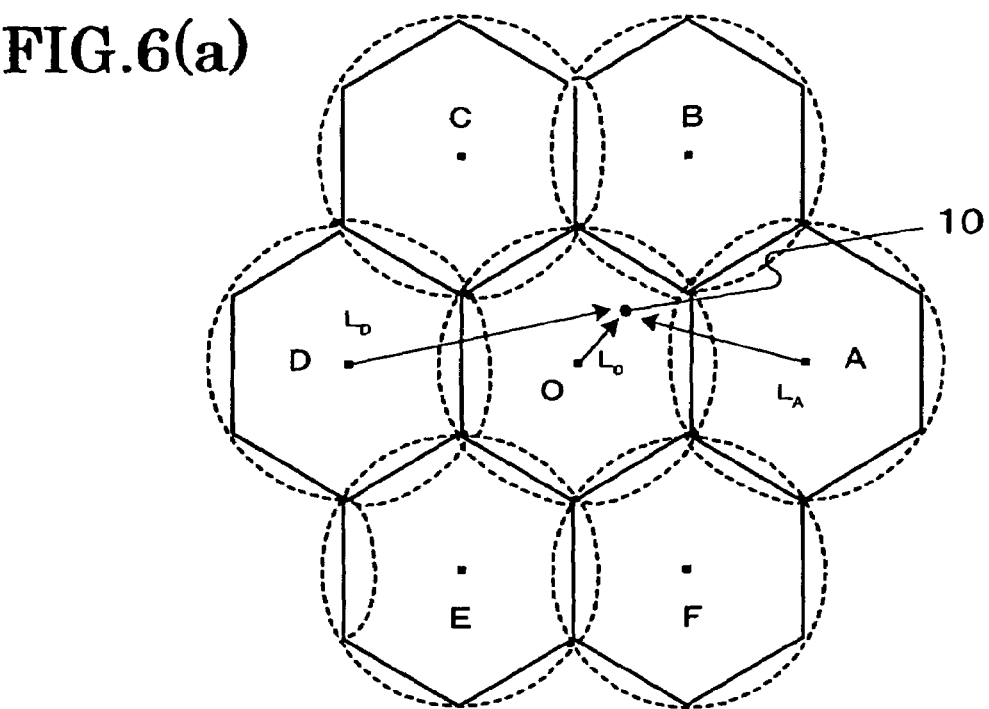
FIGS. 6(a) to 6(c) are views for describing the received electric fields of three base stations, i.e. two given neighbor base stations and the communicative base station, as measured in the received electric field measuring section 11.
Figure 6B:
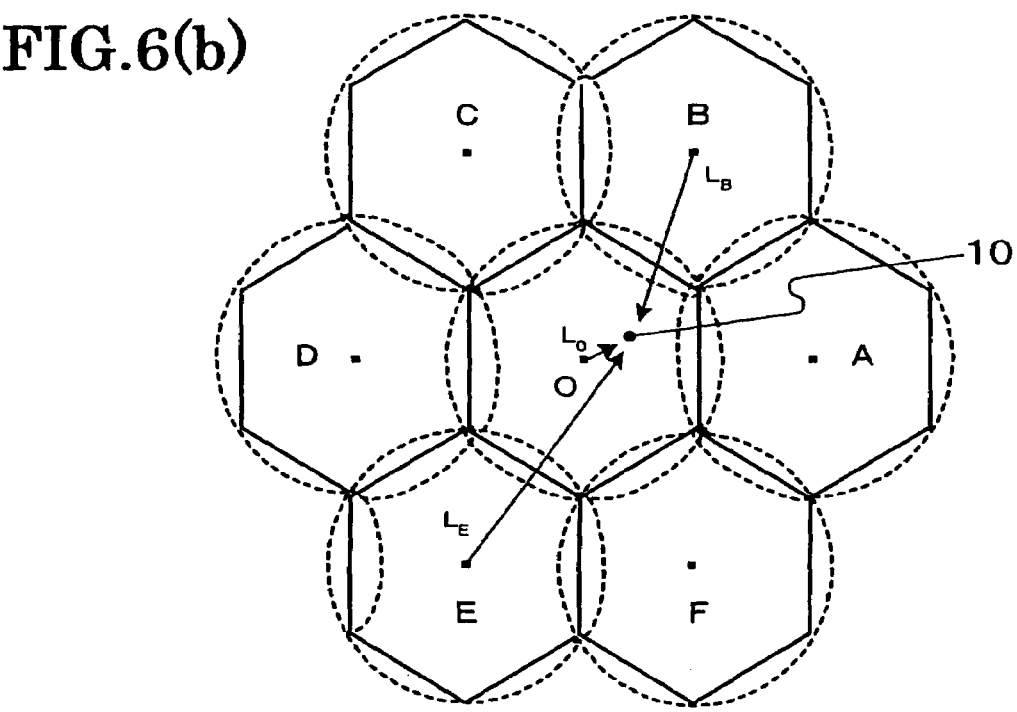
Figure 6C:
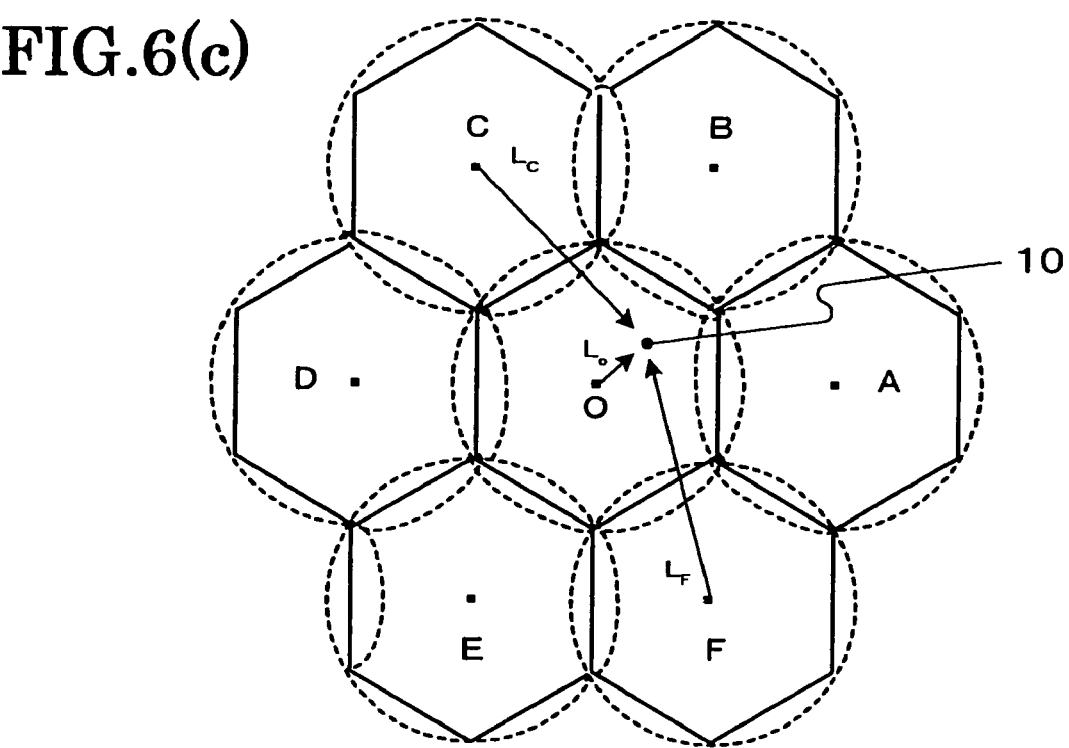

FIGS. 6(a) to 6(c) are views for describing the received electric fields of three base stations, i.e. two given neighbor base stations and the communicative base station, as measured in the received electric field measuring section 11.

When the portable terminal 10 has communicated with the communicative base station O before, like the above cases, the received electric field measuring section 11 monitors the received electric fields of a reduced number of neighbor base stations, i.e., two adjacent but two neighbor base stations, and the communicative base station O.

Preferably, as shown in FIG. 6(a), the received electric field measuring section 11 monitors the received electric fields $L_A$, $L_D$ and $L_O$ of the neighbor base stations A and D and the communicative base station O.

Preferably, as shown in FIG. 6(b), the received electric field measuring section 11 monitors the received electric fields $L_B$, $L_E$ and $L_O$ of the neighbor base stations B and E and the communicative base station O.

Preferably, as shown in FIG. 6(c), the received electric field measuring section 11 monitors the received electric fields $L_C$, $L_F$ and $L_O$ of the neighbor base stations C and F and the communicative base station O.

When the prevailing communicative base station has been in communication with the own portable terminal before, the received electric field pattern comparing section 13 compares the received electric field patterns of three base stations, i.e., two given neighbor base stations and the prevailing communicative base station, as measured by the received electric field measuring section 11 and the received electric field patterns stored in the received electric field storing section 12.

As an example, when the portable terminal 10 gets out the area of the communicative base station O and enters the neighbor base stations A to F, the received electric field pattern comparing section 13 compares the received electric fields from the two adjacent neighbor stations A and B and the communicative base station O (see FIG. 3), as received in the terminal 10 and stored in the received electric field memory section 12, and the square roots of the sum of the squares of the differences of the received electric fields $L_A$, $L_B$ and $L_O$ from the base stations A, B and O as measured in the terminal 10, as shown in FIG. 4(a).

$$\Delta_{AB}(A)=[\{L_A-L_{1A}(A)\}^2+\{L_B-L_{2B}(A)\}^2+\{L_O-L_{1O}(A)\}^2]^{1/2}$$

$$\Delta_{AB}(B)=[\{L_A-L_{2A}(B)\}^2+\{L_B-L_{1B}(B)\}^2+\{L_O-L_{1O}(B)\}^2]^{1/2}$$

$$\Delta_{AB}(C)=[\{L_A-L_{3A}(C)\}^2+\{L_B-L_{2B}(C)\}^2+\{L_O-L_{1O}(C)\}^2]^{1/2}$$

$$\Delta_{AB}(D)=[\{L_A-L_{4A}(D)\}^2+\{L_B-L_{3B}(D)\}^2+\{L_O-L_{1O}(D)\}^2]^{1/2}$$

$$\Delta_{AB}(E)=[\{L_A-L_{3A}(E)\}^2+\{L_B-L_{4B}(E)\}^2+\{L_O-L_{1O}(E)\}^2]^{1/2}$$

$$\Delta_{AB}(F)=[\{L_A-L_{2A}(F)\}^2+\{L_B-L_{3B}(F)\}^2+\{L_O-L_{1O}(F)\}^2]^{1/2}$$

FIGS. 7(a) to 7(f) are graphs showing the results $\Delta_{AB}$ of the received electric field pattern comparison.

Figure 7A:
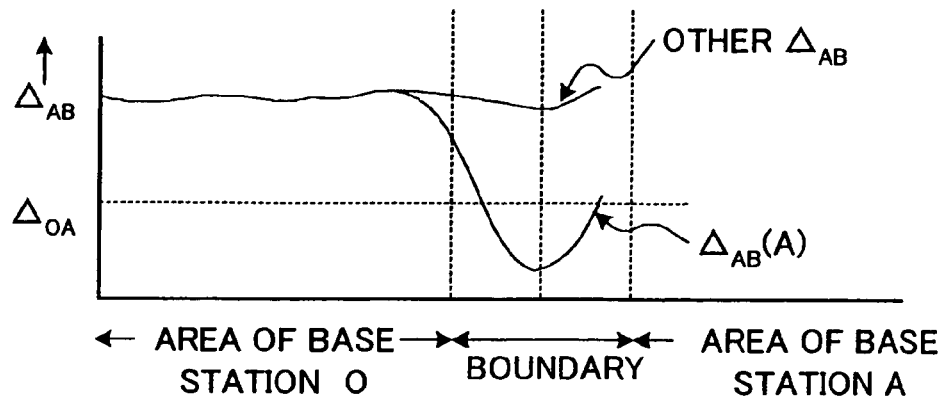
FIGS. 7(a) to 7(f) are graphs showing the results $\Delta_{AB}$ of the received electric field pattern comparison.

As shown in FIG. 7(a), when the portable terminal 10 gets out the area of the communicative base station O and enters the area of the neighbor station A, only the difference $\Delta_{AB}(A)$ is reduced compared to the other differences $\Delta_{AB}$.

When the difference $\Delta_{AB}(A)$ becomes less than a predetermined value $\Delta_{OA}$, the base station frequency switching section 15 switches the frequency, of the communicative base station O over to the frequency of the neighbor base station A.

Figure 7B:
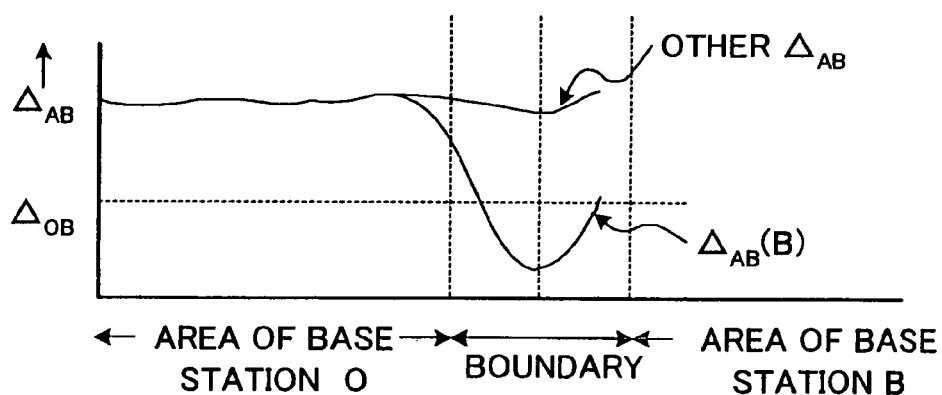

As shown in FIG. 7(b), when the portable terminal 10 gets out the area of the communicative base station O and enters the area of the neighbor station B, only the difference $\Delta_{AB}(B)$ is reduced compared to the other differences $\Delta_{AB}$.

When the difference $\Delta_{AB}(B)$ becomes less than a predetermined value $\Delta_{OB}$, the base station frequency switching section 15 switches the frequency of the communicative base station O over to the frequency of the neighbor base station B.

Figure 7C:
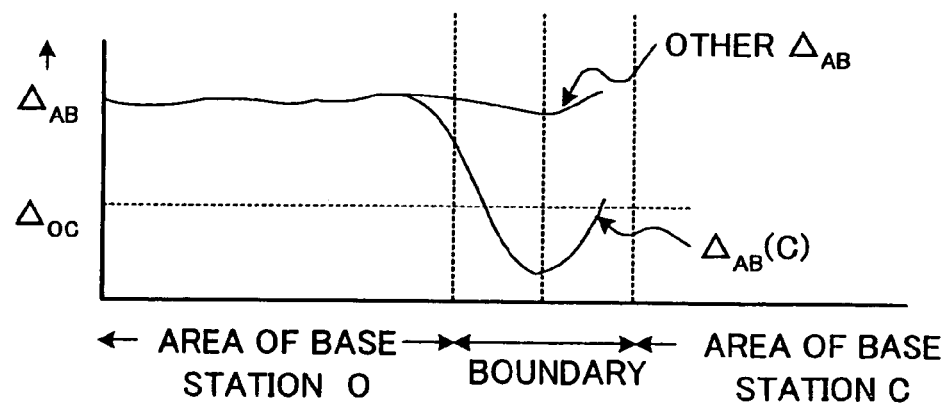

As shown in FIG. 7(c), when the portable terminal 10 gets out the area of the communicative base station O and enters the area of the neighbor station C, only the difference $\Delta_{AB}(C)$ is reduced compared to the other differences $\Delta_{AB}$.

When the difference $\Delta_{AB}(C)$ becomes less than a predetermined value $\Delta_{OC}$, the base station frequency switching section 15 switches the frequency of the communicative base station O over to the frequency of the neighbor base station C.

Figure 7D:
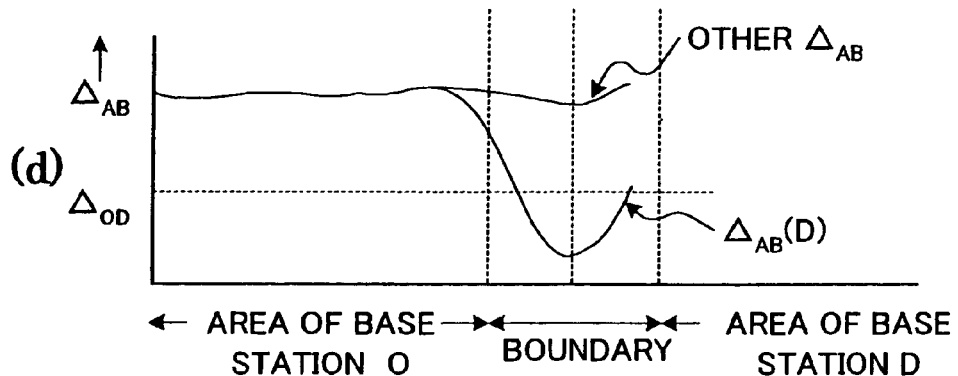

As shown in FIG. 7(d), when the portable terminal 10 gets out the area of the communicative base station O and enters the area of the neighbor station D, only the difference $\Delta_{AB}(D)$ is reduced compared to the other differences $\Delta_{AB}$. When the difference $\Delta_{AB}(D)$ becomes less than a predetermined value $\Delta_{OD}$, the base station frequency switching section 15 switches the frequency of the communicative base station O over to the frequency of the neighbor base station D.

Figure 7E:
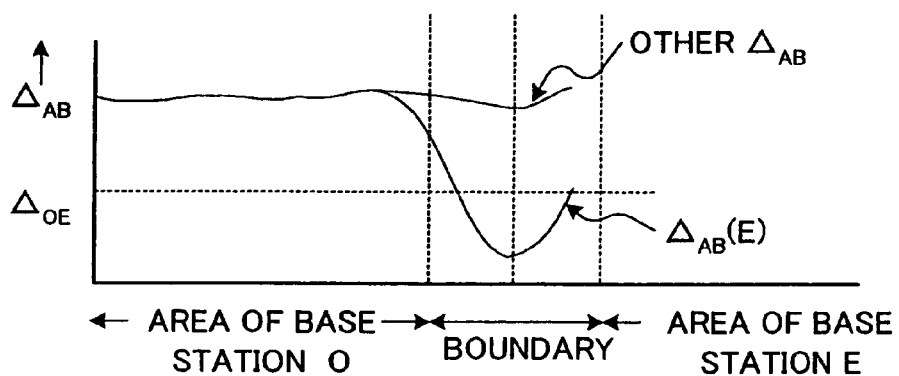

As shown in FIG. 7(e), when the portable terminal 10 gets out the area of the communicative base station O and enters the area of the neighbor station E, only the difference $\Delta_{AB}(E)$ is reduced compared to the other differences $\Delta_{AB}$.

When the difference $\Delta_{AB}(E)$ becomes less than a predetermined value $\Delta_{OE}$, the base station frequency switching section 15 switches the frequency of the communicative base station O over to the frequency of the neighbor base station E.

Figure 7F:
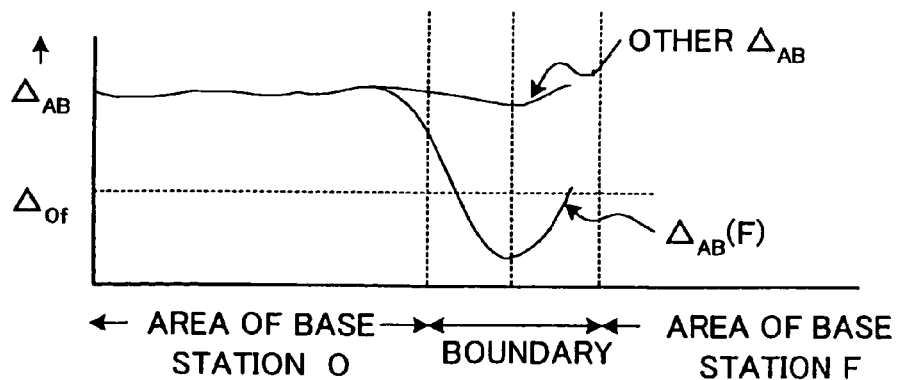

As shown in FIG. 7(f), when the portable terminal 10 gets out the area of the communicative base station O and enters the area of the neighbor station F, only the difference $\Delta_{AB}(F)$ is reduced compared to the other differences $\Delta_{AB}$.

When the difference $\Delta_{AB}(F)$ becomes less than a predetermined value $\Delta_{OF}$, the base station frequency switching section 15 switches the frequency of the communicative base station O over to the frequency of the neighbor base station F.

While the received electric field measurement has been described in connection with the case of FIG. 4(a), similar received electric field measurement results are obtainable in the cases of FIGS. 4(b) to 4(f), 5(a) to 5(f) and 6(a) to 6(c).

Figure 8:
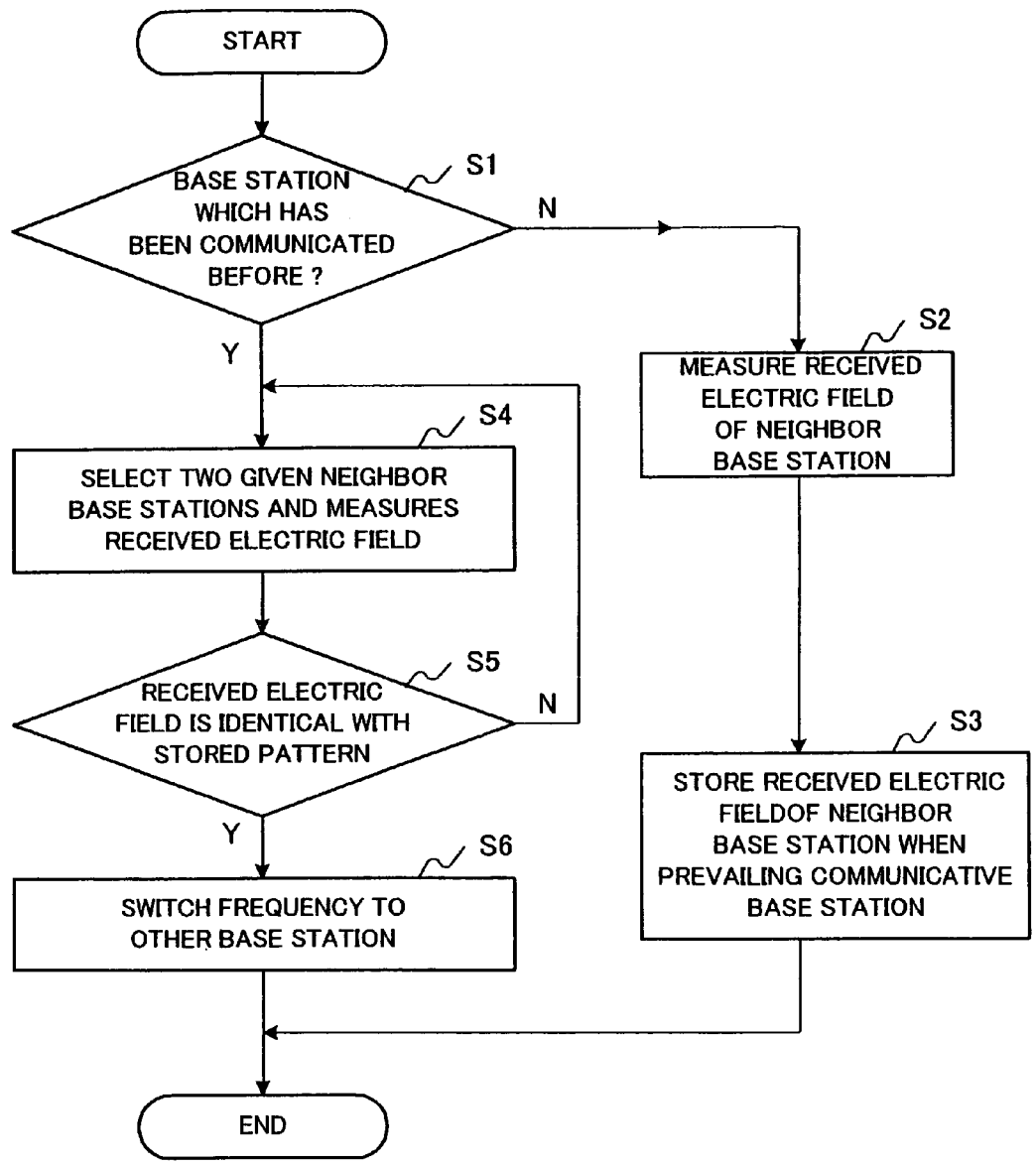
FIG. 8 is a flow chart for describing a sequence of operations in the communicative base station switching system of a portable terminal.

FIG. 8 is a flow chart for describing a sequence of operations in the communicative base station switching system of a portable terminal.

In step S1, the received electric field measuring section 1 in the received electric field switching system of the portable terminal, checks whether the terminal 10 has communicated with the communicative base station before.

When the portable terminal 10 has not communicated with the communicative base station before, the received electric field measuring section 11 executes a step S2 of measuring the received electric fields (i.e., received power levels) from the neighbor base stations concerning the communicative base station.

In a step S3, the received electric field memory section 12 stores the received electric fields of the necessary neighbor base stations when the prevailing communicative base station is switched over to a neighbor base station.

When it is found in the step S1 that the portable terminal 10 has communicated with the prevailing communicative base station before, the received electric field measuring section 11 selects two given neighbor base stations, and measures the received power levels from the three base stations, i.e., the selected neighbor base stations and the communicative base station, at a predetermined frequency (step S4).

In a step S5, the received electric field pattern comparing section 13 compares the received electric fields measured in the received electric field measuring section 11 and the stored in the received electric field memory section 12. The portable terminal position acquiring section 12 then checks whether the compared received electric field patterns are identical.

Unless the compared received electric field patterns are identical, the routine goes back to the step S4.

When the compared received electric fields are identical, the base station frequency switching section 15 executes a step S6 of base station frequency switching.

The portable terminal 10 may be used in a car or like mobile body, in which a navigation system using a GPS (Global Positioning System) is mounted. In this case, the judgment as to the direction, which the portable terminal 10 is to select for moving, is left to the GPS as follows.

Figure 9:
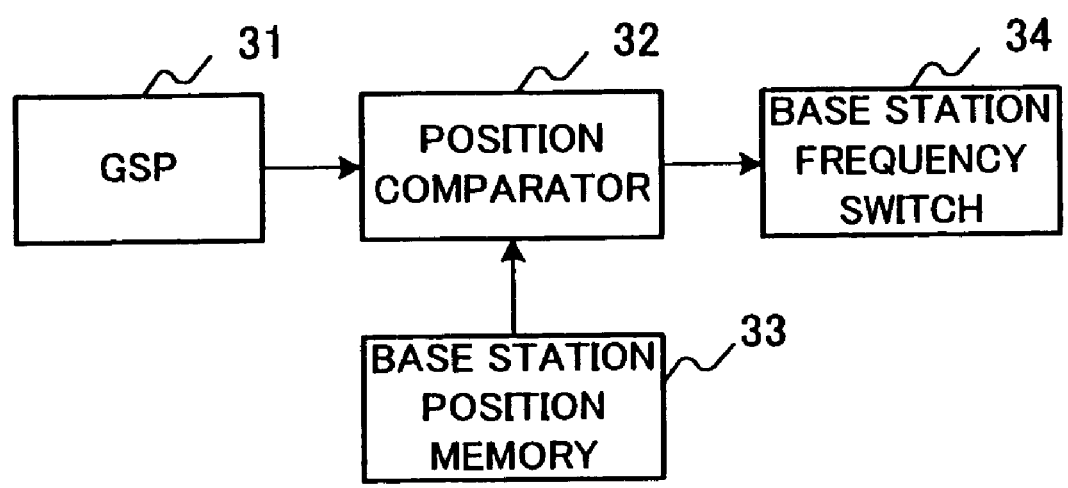
FIG. 9 is a block diagram schematically showing a different construction of the communicative base station switching system of a portable terminal according to the present invention.
Figure 10:
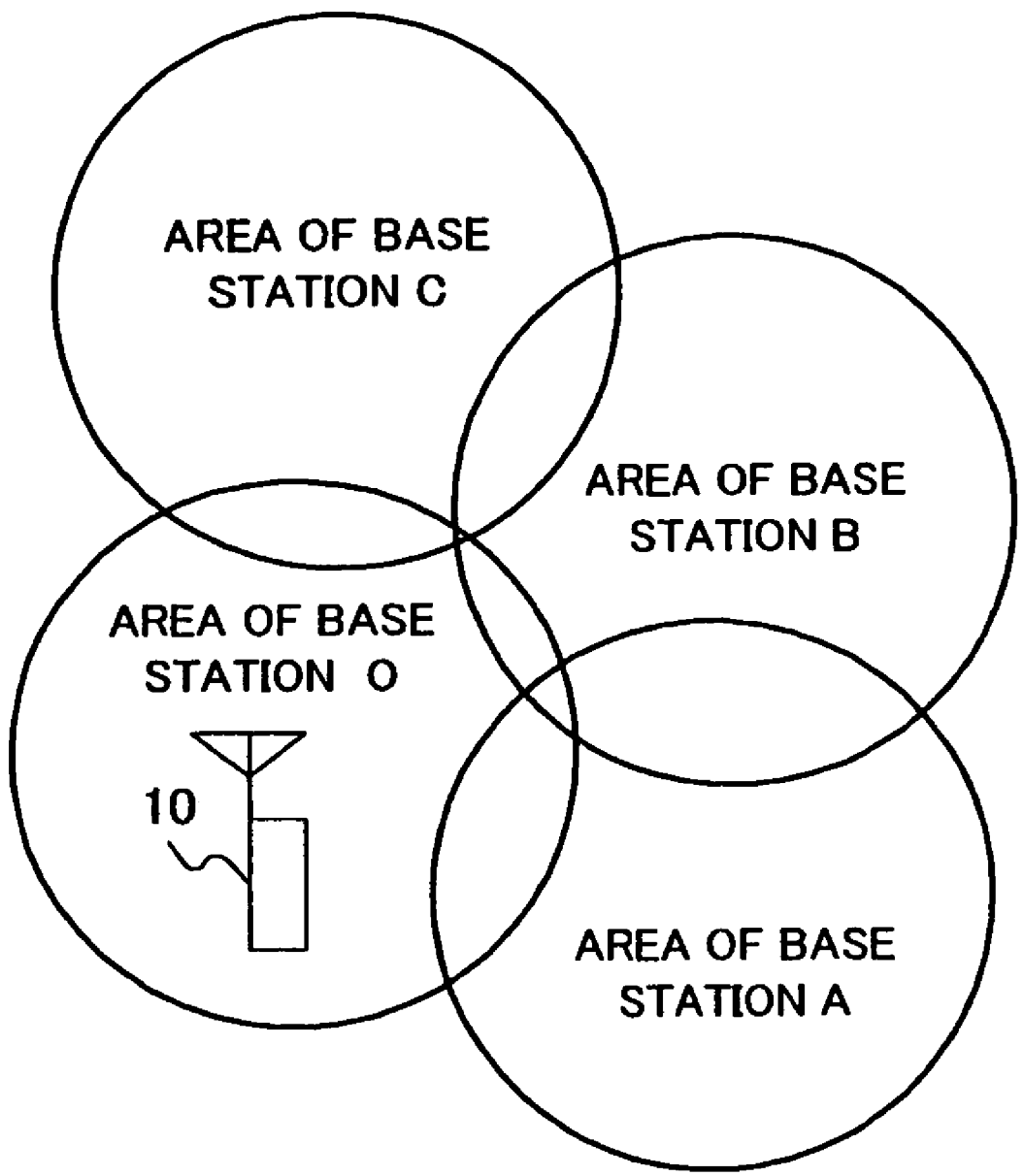
FIG. 10 is a view showing the relationship of the communicative areas covered by a portable terminal and base stations in the prior art.

FIG. 9 is a block diagram schematically showing a different construction of the communicative base station switching system of a portable terminal according to the present invention.

Referring to the Figure, the communicative base station switching system 20 of portable terminal 10 comprises a base station position memory section 33. The section 33 stores the latitude and longitude positions of base stations.

The communicative base station switching system 20 also comprises a position comparing section 32. The section 32 is connected to a GPS 31 of the mobile body, and receives the position data of the mobile body as latitude and longitude data thereof.

The position comparing section 32 compares the distances of the communicative base station and neighbor base stations from the portable terminal 10.

The position comparing section 32 is connected to a base station frequency switching section 34, which switches the frequency of the portable terminal 10 over to the frequency of a neighbor station, which is found as a result of the comparison in the position comparing section 32 to be closest to the portable terminal 10.

As shown above, the portable terminal 10 can ensure more accurate operation in co-operation with the GPS, and thus can switch frequency to the frequency of the proper base station without need of measuring the received power level from any neighbor base station.

As has been described in the foregoing, according to the present invention, the received electric field patterns of the communicative base station and two given neighbor base stations as measured in the received electric field measuring section are stored whenever the communicative base station to be communicated with for the first time is switched over to a neighbor base station, and the received electric field patterns of the communicative base station having been in communication with before and two given neighbor base stations are compared with the received electric field patterns stored in the received electric field memory section whenever the received electric fields from the communicative base station and the two given neighbor base stations are measured in the received electric field measuring section. Thus, it is possible to reduce the number of received electric fields measured in the received electric field measuring section, prevent the deterioration of synthesizer characteristics at the time of switching of the frequency over to a neighbor base station frequency and reduce the switching time so as to provide for the possibility of other processes and reduce the burden on switching process software.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A communicative base station switching system of a portable terminal for switching a communicative base station while in motion comprising:
   a base station memory section for storing base station position data;
   a base station position comparing section for receiving position data from a global positioning system of a mobile body and obtaining and comparing the distances of a plurality of neighbor base stations from the portable terminal by using the received position data as the position data of the portable terminal; and
   a base station frequency switching section for switching the communicative base station of the portable terminal to one of the plurality of neighbor base stations based only on which of the plurality of neighbor base stations is closest to the portable terminal according to the result of comparison in the base station position comparing section,
   wherein the base station position memory section stores latitude and longitude positions the plurality of neighbor base stations; and
   wherein the base station frequency switching section switches the communicative base station of the portable terminal to said one of the plurality of neighbor base stations, without measuring a received power level from any of the plurality of neighbor base stations, thereby reducing a time and burden on the base station frequency switching section.

2. The communicative base station switching system according to claim 1, further comprising a global positioning system section for obtaining latitude and longitude positions of the plurality of neighbor base stations.

3. A communicative base station switching system of a portable terminal for switching a communicative base station while in motion in which base station position data and portable terminal position data are obtained, distances of a plurality of neighbor base stations from the portable terminal are obtained on the basis of the obtained position data, and the communicative base station of the portable terminal is switched to one of the plurality of neighbor base stations based only on which of the plurality of neighbor base station is located closest to the portable terminal, said communication base station switching system further comprising a global positioning system section for obtaining latitude and longitude positions of the plurality of neighbor base stations, and wherein the communicative base station of the portable terminal is switched to said one of the plurality of neighbor base stations without measuring a received power level from any of the plurality of neighbor base stations, thereby reducing a time and burden on the base station frequency switching section.

4. A communicative base station switching system of a portable terminal for switching a communicative base station while in motion, the system comprising:

a base station memory section that stores base station position data for a plurality of neighbor base stations;

a base station position comparing section that receives position data from a global positioning system of a mobile body and obtains and compares the distances of the plurality of neighbor base stations from the portable terminal by using the received position data as the position data of the portable terminal; and a base station frequency switching section that switches the communicative base station of the portable terminal to one of the plurality of neighbor base stations based on which of the plurality of neighbor base stations is closest to the portable terminal according to the result of comparison in the base station position comparing section, without measuring a power level from any of the plurality of neighbor base stations, thereby reducing a time and burden on the base station frequency switching section, wherein the base station position memory section stores latitude and longitude positions of the plurality of neighbor base stations.

5. The communicative base station switching system according to claim 4, further comprising a global positioning system section that obtains latitude and longitude positions of the plurality of neighbor base stations.

* * * * *